US012046429B2

(12) United States Patent
Maragni et al.

(10) Patent No.: US 12,046,429 B2
(45) Date of Patent: Jul. 23, 2024

(54) FIVE-POSITION SWITCH

(71) Applicant: Essex Industries, Inc., St. Louis, MO (US)

(72) Inventors: Michael Maragni, Manchester, MO (US); Leane Darnold, Kirkwood, MO (US); Brian Joachimsthaler, Glen Carbon, IL (US)

(73) Assignee: Essex Industries, Inc., St. Louis, MO (US)

( * ) Notice: Subject to any disclaimer, the term of this patent is extended or adjusted under 35 U.S.C. 154(b) by 0 days.

(21) Appl. No.: 18/196,060

(22) Filed: May 11, 2023

(65) Prior Publication Data

US 2023/0290590 A1 Sep. 14, 2023

Related U.S. Application Data

(63) Continuation of application No. 17/695,768, filed on Mar. 15, 2022, now Pat. No. 11,688,568.

(60) Provisional application No. 63/161,203, filed on Mar. 15, 2021.

(51) Int. Cl.

*H01H 23/16* (2006.01)
*H01H 13/14* (2006.01)
*H01H 13/20* (2006.01)

(52) U.S. Cl.

CPC ............ *H01H 23/16* (2013.01); *H01H 13/14* (2013.01); *H01H 13/20* (2013.01)

(58) Field of Classification Search

CPC ........ H01H 23/16; H01H 13/14; H01H 13/20; H01H 23/205; H01H 23/20; H01H 2001/0005; H01H 25/008; H01H 23/003; H01H 3/02; H01H 3/32; H01H 3/46; H01H 23/162; H01H 25/04; H01H 25/041; H01H 25/06

See application file for complete search history.

(56) References Cited

U.S. PATENT DOCUMENTS 3,828,148 A 8/1974 Roeser
3,957,230 A 5/1976 Boucher et al.
3,977,004 A 8/1976 Bickel
3,981,611 A 9/1976 Jensen
4,032,091 A 6/1977 Reddy
4,067,139 A 1/1978 Pinkerton et al.
4,079,902 A 3/1978 Ryzhko et al.
4,123,050 A 10/1978 Casado
4,140,352 A 2/1979 Delpech et al.
4,146,780 A 3/1979 Sprey
4,168,046 A 9/1979 Hasquenoph et al.
(Continued)

FOREIGN PATENT DOCUMENTS

EP 1283537 A1 2/2003
JP 2004087290 A 3/2004
KR 20160087923 A 7/2016

*Primary Examiner* — Lheiren Mae A Caroc
(74) *Attorney, Agent, or Firm* — Lewis Rice LLC

(57) ABSTRACT

Multiple position switches and specifically in-line multiple position switches where a user has definitive points of on and off switching which are used to turn multiple redundant internal circuit switches on and off. This can provide for increased reliability of switch operation. The multi-position switch is typically a five-position switch with all five positions in-line and with double or triple redundancy at each position. The switches can also provide for the feel of a snap action mechanism between positions.

20 Claims, 24 Drawing Sheets

(56) References Cited

U.S. PATENT DOCUMENTS

| | | | |
|---|---|---|---|
| 4,175,701 | A | 11/1979 | Wojciehowski et al. |
| 4,228,386 | A | 10/1980 | Griffith |
| 4,233,652 | A | 11/1980 | Oswald |
| 4,275,858 | A | 6/1981 | Bolton et al. |
| 4,287,907 | A | 9/1981 | Worthy |
| 4,299,361 | A | 11/1981 | Webb |
| 4,326,189 | A | 4/1982 | Crane |
| 4,330,827 | A | 5/1982 | Kettler |
| 4,332,032 | A | 5/1982 | Daniel |
| 4,335,745 | A | 6/1982 | Bouveret et al. |
| 4,340,791 | A | 7/1982 | Sorenson |
| 4,347,901 | A | 9/1982 | Wilhoit |
| 4,351,394 | A | 9/1982 | Enk |
| 4,372,212 | A | 2/1983 | Hoelzen et al. |
| 4,413,322 | A | 11/1983 | Foster et al. |
| 4,472,780 | A | 9/1984 | Chenoweth et al. |
| 4,476,395 | A | 10/1984 | Cronin |
| 4,482,018 | A | 11/1984 | Enk et al. |
| 4,492,924 | A | 1/1985 | Nilsson |
| 4,502,691 | A | 3/1985 | Ratliff et al. |
| 4,531,081 | A | 7/1985 | Liesegang |
| 4,573,937 | A | 3/1986 | Stanzel |
| 4,616,793 | A | 10/1986 | Hassler, Jr. |
| 4,667,094 | A | 5/1987 | Van-Hecke et al. |
| 4,700,046 | A | 10/1987 | Fristedt |
| 4,735,380 | A | 4/1988 | Barousse et al. |
| 4,737,107 | A | 4/1988 | Bories et al. |
| 4,739,335 | A | 4/1988 | Fourmaud et al. |
| 4,762,294 | A | 8/1988 | Carl |
| 4,765,568 | A | 8/1988 | Carl et al. |
| 4,779,683 | A | 10/1988 | Enk |
| 4,814,579 | A | 3/1989 | Mathis et al. |
| 4,885,514 | A | 12/1989 | Novis et al. |
| 4,915,185 | A | 4/1990 | Olson |
| 4,936,389 | A | 6/1990 | MacDonald et al. |
| 4,968,946 | A | 11/1990 | Maier |
| 4,969,367 | A | 11/1990 | Huber et al. |
| 5,104,062 | A | 4/1992 | Glaze |
| 5,104,344 | A | 4/1992 | Jancso, Jr. |
| 5,129,826 | A | 7/1992 | Munsch |
| 5,165,625 | A | 11/1992 | Gutman |
| 5,222,166 | A | 6/1993 | Weltha |
| 5,261,778 | A | 11/1993 | Zschoche |
| 5,267,709 | A | 12/1993 | Koharcheck et al. |
| 5,367,901 | A | 11/1994 | Petersen |
| 5,381,987 | A | 1/1995 | Carns |
| 5,391,080 | A | 2/1995 | Bernacki et al. |
| 5,404,085 | A | 4/1995 | Resch et al. |
| 5,404,897 | A | 4/1995 | Rozenblatt |
| 5,479,162 | A | 12/1995 | Barger et al. |
| 5,512,917 | A | 4/1996 | Scott |
| 5,515,898 | A | 5/1996 | Alcocer |
| 5,621,400 | A | 4/1997 | Corbi |
| 5,627,744 | A | 5/1997 | Baker et al. |
| 5,642,022 | A | 6/1997 | Sanz et al. |
| 5,659,243 | A | 8/1997 | Smith |
| 5,709,103 | A | 1/1998 | Williams |
| 5,813,630 | A | 9/1998 | Williams |
| 5,824,978 | A | 10/1998 | Karasik et al. |
| 5,899,411 | A | 5/1999 | Latos et al. |
| 5,930,134 | A | 7/1999 | Glennon |
| 5,984,241 | A | 11/1999 | Sparks |
| 6,016,016 | A | 1/2000 | Starke et al. |
| 6,062,809 | A | 5/2000 | Berkey et al. |
| 6,134,875 | A | 10/2000 | Massey |
| 6,158,692 | A | 12/2000 | Abild et al. |
| 6,191,547 | B1 | 2/2001 | Fricke et al. |
| 6,204,590 | B1 | 3/2001 | Audren et al. |
| 6,210,036 | B1 | 4/2001 | Eberle et al. |
| 6,224,442 | B1 | 5/2001 | Simpson et al. |
| 6,246,564 | B1 | 6/2001 | Sugiura et al. |
| 6,286,410 | B1 | 9/2001 | Leibolt |
| 6,321,707 | B1 | 11/2001 | Dunn |
| 6,325,328 | B1 | 12/2001 | Gabriel |
| 6,327,994 | B1 | 12/2001 | Labrador |
| 6,349,537 | B1 | 2/2002 | Newton |
| 6,384,573 | B1 | 5/2002 | Dunn |
| 6,439,512 | B1 | 8/2002 | Hart |
| 6,453,678 | B1 | 9/2002 | Sundhar |
| 6,480,091 | B1 | 11/2002 | Scott et al. |
| 6,489,745 | B1 | 12/2002 | Koreis |
| 6,497,389 | B1 | 12/2002 | Rawdon et al. |
| 6,550,715 | B1 | 4/2003 | Reynolds et al. |
| 6,572,974 | B1 | 6/2003 | Biscotte et al. |
| 6,580,497 | B1 | 6/2003 | Asaka et al. |
| 6,603,216 | B2 | 8/2003 | Costello |
| 6,622,963 | B1 | 9/2003 | Ahrendt et al. |
| 6,695,264 | B2 | 2/2004 | Schaeffer et al. |
| 6,708,929 | B1 | 3/2004 | Gabriel |
| 6,733,358 | B1 | 5/2004 | Wuest |
| 6,779,758 | B2 | 8/2004 | Vu et al. |
| 6,803,532 | B1 | 10/2004 | Lee |
| 6,865,690 | B2 | 3/2005 | Kocin |
| 6,880,466 | B2 | 4/2005 | Carman |
| 6,894,625 | B1 | 5/2005 | Kozma et al. |
| 6,914,201 | B2 | 7/2005 | Van Vooren et al. |
| 6,929,222 | B2 | 8/2005 | Djuric |
| 6,980,104 | B2 | 12/2005 | Pahl et al. |
| 7,014,148 | B2 | 3/2006 | Dominguez |
| 7,042,693 | B2 | 5/2006 | Silence et al. |
| 7,044,335 | B2 | 5/2006 | Aguirre et al. |
| 7,176,811 | B1 | 2/2007 | Parry |
| 7,219,023 | B2 | 5/2007 | Banke et al. |
| 7,230,292 | B2 | 6/2007 | Graettinger |
| 7,246,771 | B2 | 7/2007 | Wisch et al. |
| 7,273,384 | B1 | 9/2007 | So |
| 7,336,473 | B2 | 2/2008 | Gross |
| 7,397,209 | B2 | 7/2008 | Hirai |
| 7,469,862 | B2 | 12/2008 | Layland et al. |
| 7,472,863 | B2 | 1/2009 | Pak |
| 7,482,709 | B2 | 1/2009 | Berenger |
| 7,513,458 | B2 | 4/2009 | Layland et al. |
| 7,546,186 | B2 | 6/2009 | Yang |
| 7,546,981 | B2 | 6/2009 | Hoffjann et al. |
| 7,556,224 | B2 | 7/2009 | Johnson et al. |
| 7,592,783 | B1 | 9/2009 | Jarvinen |
| 7,598,625 | B2 | 10/2009 | Yu et al. |
| 7,629,718 | B2 | 12/2009 | Gruendel et al. |
| 7,651,052 | B2 | 1/2010 | Delort |
| 7,677,529 | B2 | 3/2010 | Siska, Jr. et al. |
| 7,688,084 | B2 | 3/2010 | Erdmann et al. |
| 7,723,935 | B2 | 5/2010 | Kneller et al. |
| 7,726,606 | B2 | 6/2010 | Graf et al. |
| 7,823,967 | B2 | 11/2010 | Parnis et al. |
| 7,825,830 | B2 | 11/2010 | Joyner |
| 7,828,247 | B2 | 11/2010 | Greene |
| 7,845,263 | B1 | 12/2010 | Miller |
| 7,857,107 | B2 | 12/2010 | Yamamoto et al. |
| 7,870,726 | B2 | 1/2011 | Matsui |
| 7,875,993 | B2 | 1/2011 | Godo |
| 7,891,605 | B2 | 2/2011 | Nguyen et al. |
| 7,901,115 | B2 | 3/2011 | Chien |
| 7,942,370 | B2 | 5/2011 | Hillgren et al. |
| 7,975,960 | B2 | 7/2011 | Cox et al. |
| 7,994,939 | B2 | 8/2011 | Salvaudon |
| 8,039,767 | B2 | 10/2011 | Saomoto |
| 8,052,311 | B2 | 11/2011 | Xhunga |
| 8,083,392 | B2 | 12/2011 | Chien |
| 8,089,415 | B1 | 1/2012 | West |
| 8,096,499 | B2 | 1/2012 | Osswald et al. |
| 8,104,129 | B2 | 1/2012 | Tang et al. |
| 8,152,247 | B2 | 4/2012 | Colin |
| 8,181,903 | B2 | 5/2012 | Posva |
| 8,209,107 | B2 | 6/2012 | Rozman et al. |
| 8,217,630 | B2 | 7/2012 | Markunas et al. |
| 8,263,882 | B2 | 9/2012 | Laurent et al. |
| 8,274,383 | B2 | 9/2012 | Mitchell et al. |
| 8,287,326 | B2 | 10/2012 | Huang et al. |
| 8,371,526 | B2 | 2/2013 | Shearer et al. |
| 8,378,510 | B2 | 2/2013 | Tanaka et al. |
| 8,390,972 | B2 | 3/2013 | Simper et al. |
| 8,408,494 | B2 | 4/2013 | Garcia Rojo |
| 8,417,995 | B2 | 4/2013 | Davy et al. |
| 8,418,956 | B2 | 4/2013 | Fukui |

(56) References Cited

U.S. PATENT DOCUMENTS

| | | | |
|---|---|---|---|
| 8,436,485 | B1 | 5/2013 | Smith |
| 8,502,093 | B2 | 8/2013 | Kishimoto et al. |
| 8,547,675 | B2 | 10/2013 | Maier |
| 8,567,762 | B2 | 10/2013 | Venturini et al. |
| 8,581,155 | B2 | 11/2013 | Leary et al. |
| 8,600,584 | B2 | 12/2013 | Fervel et al. |
| 8,604,741 | B2 | 12/2013 | Lebrun |
| 8,612,067 | B2 | 12/2013 | Leon et al. |
| 8,616,492 | B2 | 12/2013 | Oliver |
| 8,753,122 | B2 | 6/2014 | Bohlender |
| 8,757,542 | B2 | 6/2014 | Hopdjanian et al. |
| 8,783,611 | B2 | 7/2014 | Peryea et al. |
| 8,786,232 | B2 | 7/2014 | Chai et al. |
| 8,787,031 | B2 | 7/2014 | Hania |
| 8,829,737 | B2 | 9/2014 | Carrillo |
| 8,830,888 | B2 | 9/2014 | Shin et al. |
| 8,840,070 | B2 | 9/2014 | Boucaud et al. |
| 8,843,660 | B1 | 9/2014 | Galibois et al. |
| 8,868,808 | B1 | 10/2014 | Galibois et al. |
| 8,886,370 | B2 | 11/2014 | Carlavan et al. |
| 8,935,018 | B2 | 1/2015 | Hughes et al. |
| 8,939,401 | B2 | 1/2015 | Pereira et al. |
| 8,973,393 | B2 | 3/2015 | Atkey et al. |
| 8,978,840 | B2 | 3/2015 | Lang et al. |
| 8,981,265 | B2 | 3/2015 | Jiao et al. |
| 8,982,441 | B2 | 3/2015 | Schlam et al. |
| 9,010,959 | B2 | 4/2015 | Edelson et al. |
| 9,030,557 | B2 | 5/2015 | Wende et al. |
| 9,033,273 | B2 | 5/2015 | Edelson et al. |
| 9,064,646 | B2 | 6/2015 | Wavering |
| 9,067,691 | B2 | 6/2015 | Pugh et al. |
| 9,071,050 | B2 | 6/2015 | Kamihara et al. |
| 9,081,372 | B2 | 7/2015 | Fervel et al. |
| 9,106,125 | B1 | 8/2015 | Brandt et al. |
| 9,121,487 | B2 | 9/2015 | De Mers et al. |
| 9,166,400 | B2 | 10/2015 | Jiao et al. |
| 9,242,728 | B2 | 1/2016 | Morrison |
| 9,295,114 | B2 | 3/2016 | Trinschek et al. |
| 9,302,636 | B2 | 4/2016 | Schult et al. |
| 9,327,839 | B2 | 5/2016 | Giles et al. |
| 9,335,366 | B2 | 5/2016 | Handy |
| 9,379,642 | B2 | 6/2016 | Lagorce et al. |
| 9,422,905 | B2 | 8/2016 | Anastasio et al. |
| 9,428,271 | B2 | 8/2016 | Becks et al. |
| 9,435,263 | B2 | 9/2016 | Chai et al. |
| 9,435,264 | B2 | 9/2016 | Chai et al. |
| 9,448,557 | B2 | 9/2016 | Maalioune |
| 9,459,640 | B2 | 10/2016 | Courteille et al. |
| 9,464,573 | B2 | 10/2016 | Remy et al. |
| 9,469,410 | B2 | 10/2016 | Peake |
| 9,469,415 | B1 | 10/2016 | Harvey |
| 9,476,385 | B2 | 10/2016 | Moore et al. |
| 9,477,629 | B2 | 10/2016 | Petillon |
| 9,484,749 | B2 | 11/2016 | Brombach et al. |
| 9,508,267 | B2 | 11/2016 | Galibois et al. |
| 9,553,467 | B2 | 1/2017 | Yasui |
| 9,611,049 | B2 | 4/2017 | Esteyne et al. |
| 9,614,465 | B2 | 4/2017 | Shriver et al. |
| 9,623,978 | B2 | 4/2017 | Anton et al. |
| 9,630,707 | B2 | 4/2017 | Jaber et al. |
| 9,637,210 | B2 | 5/2017 | Thomson |
| 9,639,997 | B2 | 5/2017 | Chai et al. |
| 9,643,729 | B2 | 5/2017 | Walter-Robinson |
| 9,670,917 | B2 | 6/2017 | Nakajima et al. |
| 9,676,475 | B2 | 6/2017 | Goldman et al. |
| 9,701,414 | B2 | 7/2017 | Vaughan et al. |
| 9,714,636 | B2 | 7/2017 | Newburg |
| 9,718,390 | B1 | 8/2017 | Hadley et al. |
| 9,729,096 | B2 | 8/2017 | Edwards |
| 9,748,060 | B2 | 8/2017 | Klonowski et al. |
| 9,764,822 | B2 | 9/2017 | Morrison |
| 9,821,915 | B2 | 11/2017 | Giles et al. |
| 9,849,849 | B2 | 12/2017 | Vieillard et al. |
| 9,950,785 | B2 | 4/2018 | Onfroy et al. |
| 9,960,597 | B2 | 5/2018 | Andrieu et al. |
| 9,964,044 | B2 | 5/2018 | Juarez Becerril et al. |
| 9,969,378 | B2 | 5/2018 | Howell et al. |
| 9,981,738 | B2 | 5/2018 | Di Zazzo et al. |
| 9,988,158 | B2 | 6/2018 | Lebrun et al. |
| 10,063,047 | B2 | 8/2018 | Duarte et al. |
| 10,082,360 | B2 | 9/2018 | Hartman et al. |
| 10,114,783 | B2 | 10/2018 | Galibois et al. |
| 10,119,495 | B1 | 11/2018 | Nestico et al. |
| 10,150,433 | B2 | 12/2018 | Pal |
| 10,168,072 | B2 | 1/2019 | Lucas et al. |
| 10,189,574 | B2 | 1/2019 | Zhou et al. |
| 10,207,839 | B2 | 2/2019 | Hearing et al. |
| 10,208,620 | B2 | 2/2019 | Montoya et al. |
| 10,218,251 | B2 | 2/2019 | Hartman et al. |
| 10,220,949 | B2 | 3/2019 | Thomaschewski |
| 10,230,574 | B2 | 3/2019 | Montrichard et al. |
| 10,239,621 | B2 | 3/2019 | Hoch et al. |
| 10,277,037 | B2 | 4/2019 | Brantl et al. |
| 10,287,030 | B2 | 5/2019 | Lutze et al. |
| 10,293,922 | B2 | 5/2019 | Cox et al. |
| 10,295,457 | B1 | 5/2019 | Ocheltree |
| 10,315,771 | B1 | 6/2019 | Rao et al. |
| 10,323,906 | B2 | 6/2019 | DeJong |
| 10,336,461 | B2 | 7/2019 | Mackin |
| 10,343,767 | B2 | 7/2019 | McCormick et al. |
| 10,358,980 | B2 | 7/2019 | Morioka et al. |
| 10,364,032 | B2 | 7/2019 | Kammerer et al. |
| 10,369,393 | B2 | 8/2019 | Wright |
| 10,370,088 | B2 | 8/2019 | Morrison |
| 10,374,416 | B2 | 8/2019 | Duarte et al. |
| 10,383,434 | B2 | 8/2019 | Enzinger et al. |
| 10,427,784 | B2 | 10/2019 | Parks |
| 10,432,016 | B2 | 10/2019 | Brookfield |
| 10,443,507 | B2 | 10/2019 | Schwarz et al. |
| 10,450,056 | B2 | 10/2019 | Joseph et al. |
| 10,457,413 | B2 | 10/2019 | Prakash et al. |
| 10,464,678 | B2 | 11/2019 | Brunaux et al. |
| 10,494,117 | B2 | 12/2019 | Bosma |
| 10,508,567 | B2 | 12/2019 | Stachowiak et al. |
| 10,508,601 | B2 | 12/2019 | Sheridan et al. |
| 10,509,304 | B2 | 12/2019 | Chien |
| 10,513,481 | B2 | 12/2019 | Lepine et al. |
| 10,543,749 | B2 | 1/2020 | Cartailler et al. |
| 10,574,131 | B2 | 2/2020 | Lutze |
| 10,587,261 | B2 | 3/2020 | Karniewicz et al. |
| 10,598,047 | B2 | 3/2020 | Clauson et al. |
| 10,604,240 | B2 | 3/2020 | Goyez et al. |
| 10,608,565 | B2 | 3/2020 | Singh et al. |
| 10,618,659 | B2 | 4/2020 | Boulet et al. |
| 10,637,724 | B2 | 4/2020 | Johnson et al. |
| 10,730,633 | B2 | 8/2020 | Anghel et al. |
| 10,750,575 | B2 | 8/2020 | Rochell |
| 10,759,536 | B2 | 9/2020 | Bajorat et al. |
| 10,787,933 | B2 | 9/2020 | Clauson et al. |
| 10,793,137 | B2 | 10/2020 | Boecke et al. |
| 10,822,099 | B2 | 11/2020 | Barone et al. |
| 10,826,409 | B2 | 11/2020 | Lacaux et al. |
| 10,829,203 | B2 | 11/2020 | Huynh |
| 10,840,040 | B2 | 11/2020 | Abdelli et al. |
| 10,866,271 | B2 | 12/2020 | Pradier et al. |
| 10,907,656 | B2 | 2/2021 | Newberry |
| 10,913,530 | B2 | 2/2021 | Cox et al. |
| 10,923,920 | B2 | 2/2021 | Loefflad |
| 10,934,008 | B2 | 3/2021 | Vondrell et al. |
| 10,964,221 | B2 | 3/2021 | Vana et al. |
| 10,967,954 | B2 | 4/2021 | Nakagawa et al. |
| 10,968,825 | B2 | 4/2021 | Mackin |
| 10,979,509 | B2 | 4/2021 | Ma et al. |
| 10,981,660 | B2 | 4/2021 | Mackin |
| 10,981,665 | B2 | 4/2021 | Arany-Kovacs et al. |
| 11,001,388 | B1 | 5/2021 | Parvizian et al. |
| 11,015,480 | B2 | 5/2021 | Waun |
| 11,027,824 | B2 | 6/2021 | Huynh |
| 11,046,433 | B2 | 6/2021 | Trotter |
| 11,053,019 | B2 | 7/2021 | Mackin |
| 11,059,603 | B2 | 7/2021 | Trinschek |
| 11,104,444 | B2 | 8/2021 | Knapp et al. |
| 11,155,365 | B2 | 10/2021 | Soejima |
| 11,159,102 | B2 | 10/2021 | Underhill et al. |

(56) References Cited

U.S. PATENT DOCUMENTS

| | | | | |
|---|---|---|---|---|
| 11,174,012 | B2 | 11/2021 | Brunetti | |
| 11,174,040 | B2 | 11/2021 | Beck | |
| 11,196,585 | B1 | 12/2021 | Auerbach et al. | |
| 11,198,502 | B2 | 12/2021 | Huynh | |
| 11,225,318 | B1 | 1/2022 | Seeley | |
| 11,230,384 | B2 | 1/2022 | Lynn et al. | |
| 11,235,861 | B2 | 2/2022 | Joseph et al. | |
| 11,240,311 | B2 | 2/2022 | Binder et al. | |
| 11,245,765 | B2 | 2/2022 | Binder et al. | |
| 11,248,524 | B2 | 2/2022 | Djelassi | |
| 11,260,988 | B2 | 3/2022 | Sure et al. | |
| 11,267,574 | B2 | 3/2022 | Benson et al. | |
| 11,274,484 | B2 | 3/2022 | Tendyra et al. | |
| 11,319,054 | B2 | 5/2022 | Weder et al. | |
| 11,336,511 | B2 | 5/2022 | Johnson et al. | |
| 11,688,568 | B2 * | 6/2023 | Maragni ................ | H01H 13/20 200/6 A |
| 2005/0006214 | A1 | 1/2005 | Fujii | |
| 2020/0097037 | A1 | 3/2020 | Asano | |
| 2022/0293363 | A1 * | 9/2022 | Maragni ................ | H01H 23/16 |

* cited by examiner

SECTION A-A

SECTION C-C

SECTION M-M

SECTION G-G

FIVE-POSITION SWITCH

CROSS REFERENCE TO RELATED APPLICATIONS

This application is a Continuation of U.S. patent application Ser. No. 17/695,768 filed Mar. 15, 2022 which claims benefit of U.S. Provisional Patent Application No. 63/161,203 filed Mar. 15, 2021. The entire disclosure of all the above documents is herein incorporated by reference.

BACKGROUND OF THE INVENTION

1. Field of the Invention

This disclosure is related to the field of switches and particularly multi-position switches that can include multiple redundancy at each position.

2. Description of the Related Art

Switches, and particularly electrical switches, are currently ubiquitous in daily human life. Switches come in all shapes and sizes and from the simple to the complex. While they are near ubiquitous, different switches need to be built to handle particular tasks. A switch, as we tend to think of it, actually includes two "switching" elements. The first of these is the underlying electrical or circuit switch which is, in many respects, the true switch. This is typically very small and is the object that physically connects and disconnects the electrical or circuit path switched by the switch. It, thus, acts to open or close the circuit which carries out the functionality the switch is related to.

The second component of the switch is the interaction component or switch head. This is typically much larger and is designed to be manipulated by a human (or other) user. The head of the switch is what many people think of as a "switch" but technically is nothing other than a specialized lever, toggle, or other piece which is configured to allow for convenient manipulation by human hands, which are typically quite large relative to the underlying electrical circuit switch, to control the action of switching the circuit.

It is in the creation of the interface between the switch head and the circuit switch where the differences in switches typically lie. As indicated, human hands (or any other body part we would want to activate a switch) are relatively large compared to electrical components which can be purposefully highly miniaturized. However, they are also highly manipulable within 3-Dimensional space with a very wide range of motion. Thus, macro scale switches are really devices to translate specific human motion acting on the switch head into an expected electrical opening or closing circuit action which circuit action causes an electrical device to behave as the human intended by their act of manipulating the head in the particular fashion they did. Thus, items we think of as switches, such as a light switch, act to take a human motion (e.g. the pushing of a toggle head up or down or the depression of a particular part of a lever head) and translate that into circuit switching in the light circuit to create the desired action of turning the light on or off.

A lot of the purpose of a switch unit is, thus, to give a human user a clear way to manipulate the operation of the underlying circuit so it does what it is intended to do when the user instructs it to do so. The need for accurate translation of human movement into actual circuit switching can be convenient or essential depending on the purpose of the switch. As electrical objects pervade human existence currently, and we trust many of them with both our and others' lives, it is, thus, highly desirable to have switches that consistently and repeatedly switch circuits when the same human actions are performed.

One place where highly accurate switching is necessary is in the operation of complex machines, particularly when the operation of those machines is directly related to the maintenance or loss of human life. While there are large numbers of such applications, one is in the operation transportation machines such as cars, trucks, boats, and aircraft.

Powered flight can easily be considered one of humankind's greatest accomplishments. The modern aircraft is an amazing piece of engineering and the skill requirements of a human pilot to keep it aloft are also impressive. Operation in three-dimensional space presents aircraft with a number of concerns that ground based vehicles simply do not have and also tends to require a human operator to need to make many more choices to keep the operation of the aircraft safe. In the first instance, humans, whether as operators or passengers in an aircraft, are not native to the skies. Aircraft have to deal with the fact that they are operating in an environment which, typically, does not allow for a safe stop to disembark human passengers or crew. A ground-based vehicle can typically be simply stopped if there are concerns in its operation, passengers and operators can disembark, and the vehicle can be safely inspected and repaired. Thus, in most cases, ground-based vehicles major concern with failure of operation is safely coming to a stop and not in being able to get where they are going.

In an aircraft, there is typically no way to safely stop in midair. Instead, should an aircraft discover a midair concern, the aircraft still needs to have a place to land and safe landing typically requires sufficient aircraft operability, sufficient landing space, and sufficient pilot control for the aircraft to return to earth in a controlled fashion and without hitting anything. An aircraft in midair is effectively only safe so long as it continues to operate correctly and safe midair operation, at least currently, is dependent on a human pilot's skills in piloting the aircraft being correctly translated by switches into aircraft actions.

In order to keep aircraft operating correctly, its electrical systems are paramount as they control virtually everything and act to communicate a pilot's requested actions into aircraft actions. Because of this, many of an aircraft's electrical systems require redundancy and this is true even down to items as simple as switches. A large number of aircraft systems are operated by switches of some form from simple toggle switches for turning components on and off to the complicated motions of a control stick which is translated by many switches into the direction that the pilot wishes to go. In order to improve safety within aircraft, many of these switches operate on double, triple, or even increased redundant circuit switches. This redundancy helps make sure that the action taken by the pilot with the macro switch they are interacting with is carried out by the underlying circuit switch since failure of a single circuit switch in the system will generally not cause the intent of the pilot to not be translated into switching within the circuit.

In addition to the need for redundancy in switches in aircraft for the purposes of safety, switches, particularly in aircraft, are often required to control many different things because of the sheer number of items that a pilot needs to control. When flying an aircraft, and particularly a rotorcraft, the pilot will often have both hands and both feet engaged with controls at all times. Thus, the need to activate additional controls that are needed during piloting typically requires that switches be located in easy reach and ideally on other controls.

To provide easy access to auxiliary controls while piloting, many of these controls (which can include everything from lighting controls, to controls over payloads, to controls for displays, to the operation of weapon systems on military aircraft) are located on the control sticks, grips, or wheels of aircraft that are held by the pilot while piloting. Auxiliary controls which are needed in flight are, therefore, often integrated into, or attached to, the controls where the hands are maintained during piloting operations. They are usually near or under where the hands are positioned during flight to allow for the switches to be operated without needing to remove the hand from the respective control and with a minimum of movement. In this way, the switches can be readily adjusted or operated by the user while maintaining full piloting control. This is not just used in aircraft, but in the operation of ground vehicles as well. A similar arrangement many people are familiar with, for example, is the inclusion of switches related to cruise control or sound system operation in a passenger car being located on the steering wheel so a user does not need to take their hands from the wheel to operate them.

While including switches on control sticks, grips, wheels, and the like is obviously highly beneficial, there is only a limited amount of space on these objects. Thus, there can only be a limited number of switches present along with the associated wiring and circuitry necessary for them to operate. While electrical components can be, and have, been successfully miniaturized over the years, it is often hard to shrink the human access component (the switch head) as humans are still relatively similar in size and have only so much control over fine motor movement. As machines have become more and more complex, and it has become more and more desirable to include additional functionality at the fingertips, so to speak, switches have had to be able to provide for more individually detectable human actions in the same space, while also making sure that the human operator operates the switches with certainty. That is, the switch provides feedback to them that the action they intended to engage is actually the one they are engaging. This latter element is often provided by switches having a visible or tactile indicator when they are in particular position and/or have moved from one position to another. For example, most switches "snap" where it is easier to hold them in a specific position than to move them between positions.

One way to have switches provide more actions is to provide infinitely variable switches. These, however, typically cannot provide distinct positions as their infinite variability effectively eliminates their ability to provide feedback as to any specific position that they are in. Thus, instead of providing infinitely variable switches, switches are often provided which have multiple distinct positions where those positions can be moved between with each position activating a different circuit switch and each position being individually detectable (typically by tactile sensation) to a human user. Technically, all switches have multiple positions in that they have at least two positions, one for on and one for off. However, this is really a single position switch. Multiple-position switches, as that term is used herein, typically refer to switches having more than one "on" position. Specifically, each "on" position acts as an "on" for a different circuit switch with the "off" position corresponding to "off" for all the circuit switches.

One such multiple-position switch is the five-position switch. A five-position switch, as the name implies, typically has five distinct "on" positions as well as a home or "off" position. As indicated, a five-position switch ideally requires a distinct amount of force to move the switch to each of the five "on" positions so as to all the user know when it is in each of them by tactile sensation and, should the user release tension on the human activation component, the switch may automatically return to the home position where no circuit switches are activated or may need to be "snapped" back to the home position. It should be noted that in a five position switch, the important aspect is that each position corresponds to a new circuit switch being closed. Previously closed circuit switches do not need to be opened when a new one is closed. This allows for each individual circuit switch activation to activate or do something new.

While multiple-position switches can have virtually any number of positions, five-position switches are a clearly valuable form of multiple-position switches as there was traditionally a very clear way to provide the five positions. Namely, a center lowered (or plunge) position, and then the four cardinal points (up, down, left, and right from center) corresponded to the five on positions while the center raised position was the home "off" position. Similarly, three position switches are also logical as they can use a center plunge position with either up and down or left and right positions creating the three on positions and the center raised position corresponding to off. Because of the inherent logic of three and five positions in 3-dimensional space, many existing and new applications call for three or five-position switches. However, traditional three and particularly five-position switches have been unable to provide circuit redundancy in a sufficiently small space as the movement positions require substantial construction to activate the circuit switches underlying them.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

There is described herein, among other things, a multi-position switch that can include multiple redundancy at each position. Specifically, the multi-position switch is a five-position switch with all five positions in-line and with double or triple redundancy at each position Based on the above, there is a need in the art to provide for multiple position switches where a user has definitive points of on and off switching which are used to turn multiple redundant internal circuit switches on and off to provide for increased reliability of switch operation. It is also desirable for the multiple positions of the multiple position switch to be in-line.

There is described herein, among other things, a multi-position switch comprising: a switch head; a button support attached to said switch head and configured to rotate to a first detent position located on a first side of a center position and a second detent position located on a second side opposing said first side of said center position; a first piston shaft connected to said button support and connected to a first roller positioned in a first rocker; a second piston shaft connected to said button support and connected to a second roller positioned in a second rocker; a first circuit switch arranged so as to be switched when said first rocker is rotated by said first roller as said button support rotates to said first detent position; a second circuit switch arranged so as to be switched when said second rocker is rotated by said second roller as said button support rotates to said second detent position; and a plunger located between said first piston shaft and said second piston shaft where depression of said button support in said center position causes said plunger to switch a third circuit switch.

In an embodiment of the multi-position switch, the first circuit switch is one of a plurality of switches switched when said first rocker is rotated by said first roller as said button support rotates to said first detent position.

In an embodiment of the multi-position switch, the second circuit switch is one of a plurality of switches switched when said second rocker is rotated by said second roller as said button support rotates to said second detent position.

In an embodiment of the multi-position switch, the third circuit switch is one of a plurality of switches switched by said plunger when said button support in said center position is depressed.

In an embodiment of the multi-position switch, the button support is configured to rotate from said first detent position to a third detent position located on said first side of said center position.

In an embodiment, the multi-position switch further comprises: a fourth circuit switch arranged so as to be switched when said first rocker is rotated by said first roller as said button support rotates to said third detent position;

In an embodiment of the multi-position switch, the button support is configured to rotate from said second detent position to a fourth detent position located on said second side of said center position.

In an embodiment, the multi-position switch further comprises: a fifth circuit switch arranged so as to be switched when said second rocker is rotated by said second roller as said button support rotates to said fourth detent position.

In an embodiment of the multi-position switch, the fourth circuit switch is one of a plurality of switches switched when said first rocker is rotated by said first roller as said button support rotates to said third detent position.

In an embodiment of the multi-position switch, the fifth circuit switch is one of a plurality of switches switched when said second rocker is rotated by said second roller as said button support rotates to said fourth detent position.

In an embodiment of the multi-position switch, the plunger includes a lower paddle portion and an upper tab, said upper tab interfacing with a plurality of detents on said button support as said button support moves from said center position to said first detent position and from said center position to said second detent position.

In an embodiment of the multi-position switch, the lower paddle portion includes a lower segment and a narrower upper segment.

DETAILED DESCRIPTION OF THE PREFERRED EMBODIMENT(S)

Figure 1:
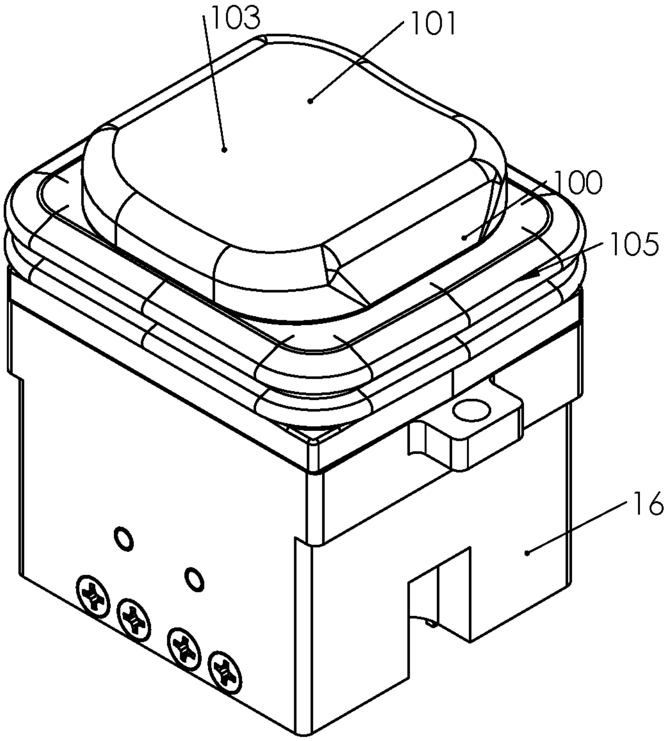
FIG. 1 depicts a left top perspective view of a first embodiment of a multiple position switch.
Figure 2:
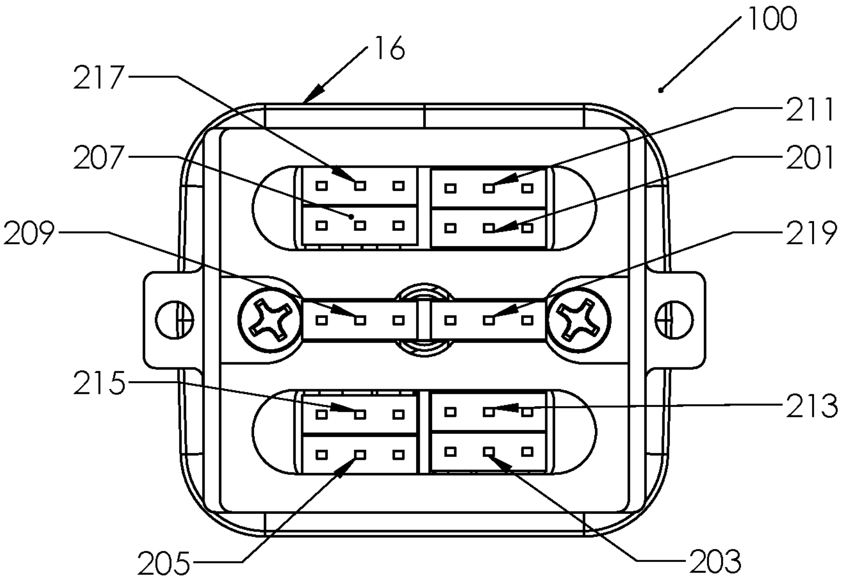
FIG. 2 depicts a bottom view of the multiple position switch of FIG. 1.
Figure 3:
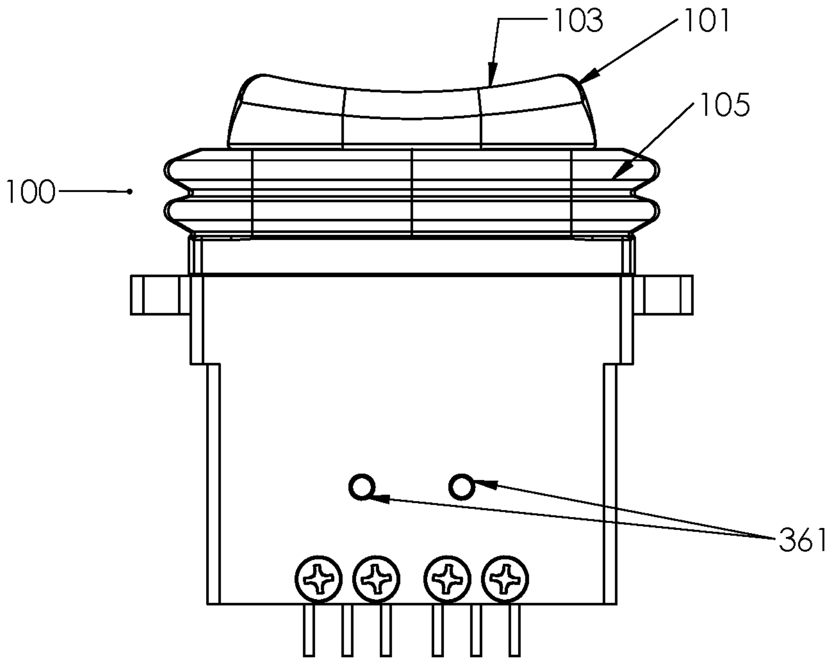
FIG. 3 depicts a left side view of the multiple position switch of FIG. 1.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

While this disclosure will utilize terms such as "above", "below", "forward", "back", "left" or "right" these terms are used as a matter of convenience to describe the typical arrangement of a device when interacted with by a human user and are not intended to imply an absolute direction relative to the Earth or other body. For example, while a first object which is "below" a second object will typically be closer to the earth than the second object in routine operation, this is not intended to be required as the devices herein could be oriented in any direction relative to the Earth or relative to any gravitational field (or without one, such as in deep space). Instead, these terms are used to show relative positioning of objects to each other. Thus, if a third object was "above" the second object in the prior example, the three objects would typically be arranged generally linearly from the first object, to the second object, to the third object regardless of the various objects' positions in space. Similarly, an object on the right would be on a generally opposing side to an object on the left and movement forward would be in the generally opposing direction to movement backward.

FIGS. 1 through 4 show various views of an embodiment of a five-position switch (100) which provides for five in-line "on" positions and a center "off" position. In particular, the switch (100) has two detents in one direction (which is called "forward" in this disclosure), two detents in opposite direction (which is called the "backward" direction in this disclosure) and a center plunge position. Each position of the switch (100) can activate one, two, three, or more circuit switches simultaneously providing it with multiple redundancy at virtually any level. This type of switch (100) with double or triple redundancy is well suited for mounting in a grip or similar component of an aircraft for activation by a pilot with their thumb. However, it may be used in any application which calls for a five-position switch.

The switch of FIGS. 1 through 4 includes a housing (16). The switch head (101) extends therefrom. The switch head (101) is the portion of the switch that is intended to be human activated. As such it may be any form of object which is designed to be pushed or pulled by a human. In the depicted embodiment, the switch head (101) comprises a generally square or "squircle" shape in cross section. The upper surface (103) thereof is typically concave in at least one major dimension. As shown in the switch (1000) of the alternative embodiment of FIGS. 12-16, the switch head (101) may include knurling or texturing (113) to increase friction when contacted by a finger or thumb the pad of which would typically be placed into the concave surface (103). The switch head (101) is surrounded by a cowl (105) which is designed to allow the head (101) to move relative to the housing (16) while still keeping objects (including dust and dirt) and moisture out of the housing (16).

At the lower portion of the housing, there are mounted a number of circuit switches (201), (203), (205), (207), (209), (211), (213), (215), (217) and (219). In the depicted embodiment, there are ten such circuit switches (201), (203), (205), (207), (209), (211), (213), (215), (217) and (219) depicted. As this is a five-position switch, each "on" position will activate two of the circuit switches (201), (203), (205), (207), (209), (211), (213), (215), (217) and (219) compared to other positions which provides each position with double redundancy. The circuit switches (201), (203), (205), (207), (209), (211), (213), (215), (217) and (219) are paired with circuit switches (201) and (211) being together, circuit switches (203) and (213) being together, circuit switches (205) and (215) being together, circuit switches (207) and (217) being together, and circuit switches (209) and (219) being together. It should be apparent that each pair of switches could be replaced by a single circuit switch, or by three or more circuit switches if a different level of redundancy is desired. Each of the circuit switches (201), (203), (205), (207), (209), (211), (213), (215), (217) and (219) will generally comprise a micro or sub-micro button switch such as, but not limited to, the B1 basic series of switches or the B3 basic series of switches produced by Otto. This particular type of switch is, however, by no means required and any sort of circuit switch activated by the motion of the switch (100) discussed herein may be used.

Figure 4:
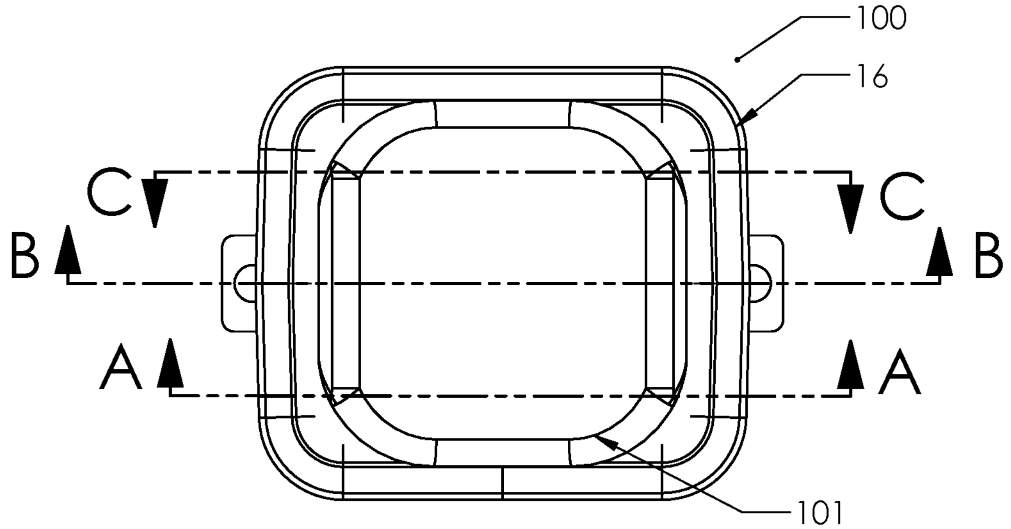
FIG. 4 depicts a top view of the multiple position switch of FIG. 1 with no circuit switches activated (home position).
Figure 6:
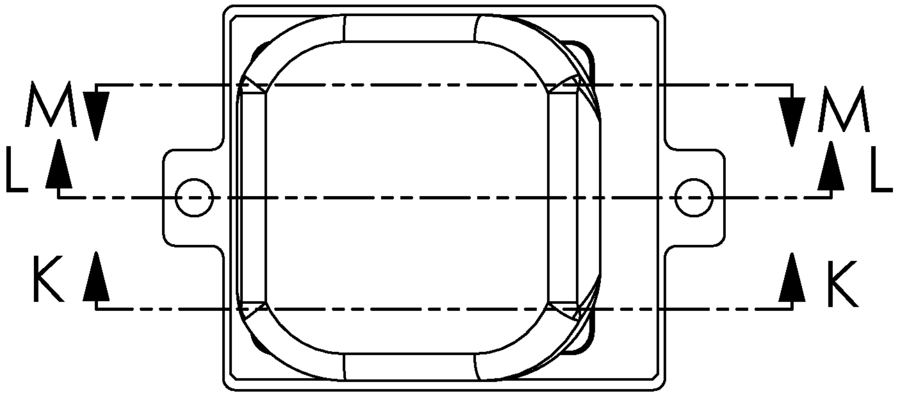
FIG. 6 depicts a top view of the multiple position switch of FIG. 1 with the near forward linear position switches activated (first position).
Figure 8:
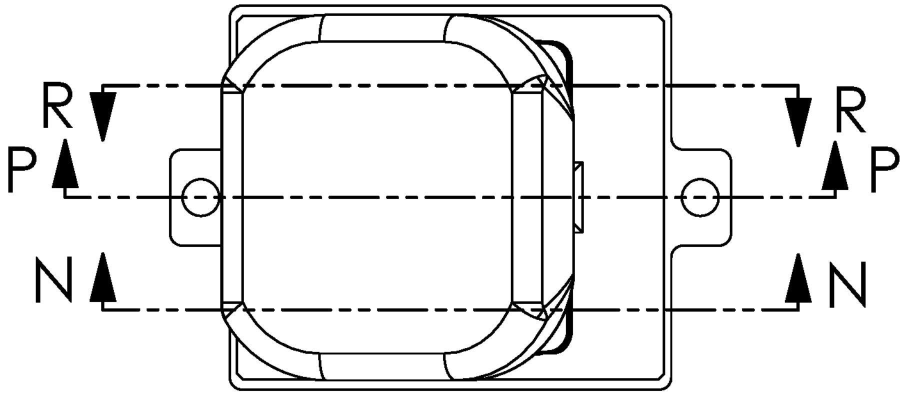
FIG. 8 depicts a top view of the multiple position switch of FIG. 1 with the far forward linear position switches activated (second position).
Figure 10:
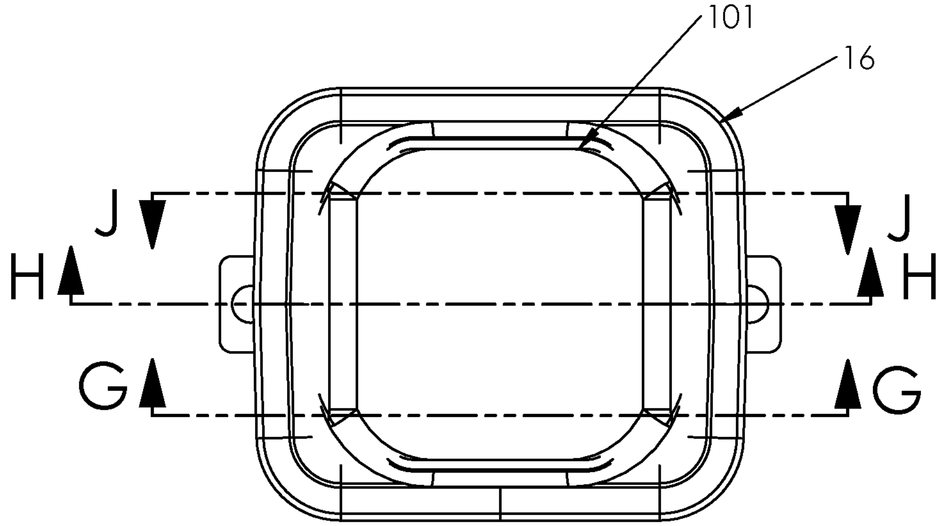
FIG. 10 depicts a top view of the multiple position switch of FIG. 1 with the plunge switches activated (plunge position).

The head (101) typically has five different linear positions into which it may be placed. In FIGS. 4 and 10, the head (101) is shown in a center position. In FIG. 4 the head (101) is not depressed so the switch (100) is in the off or home position. In FIG. 10 the head (101) is depressed and is in the plunge position. FIG. 6 shows the head (101) in a first detent position which in this embodiment is also referred to as a near forward position. FIG. 8 then shows the head (101) in the second detent position or far forward position. The use of the terms "near" and "far" are arbitrary here and are simply used to indicate that the head (101) in a far position is further from the center than in a near position.

The switch (100) will now be discussed in conjunction with the various internal components. The structure of the internals of the switch (100) are best seen by Examining the series of FIGS. 5A, 5B, and 5C; the series of FIGS. 7A, 7B, and 7C; the series of FIGS. 9A, 9B, and 9C; or the series of FIGS. 11A, 11B, and 11C as each of these shows cut-through drawings of the switch at various lines as indicated in the respective FIGS. 4, 6, 8, and 10. For ease of discussion and display, FIGS. 5A, 5B, and 5C have been labeled with all the various structural components while FIGS. 7A, 7B, 7C, 9A, 9B, 9C, 11A, 11B, and 11C only have a subset of components labeled to assist in showing relative positioning.

There is further provided an alternative embodiment which is provided in FIGS. 12-16. This alternative embodiment is generally similar to the other embodiment of FIGS. 1-11C however the head (101) is textured (113) as contemplated above and the alternative embodiment utilizes a different shape of plunger (20). The plunger (20) in FIGS. 12-16 has a paddle portion (1402) that is generally different to paddle portion (402) to provide for some structural differences and improved functionality in certain situations. However, the function of the switch (1000) and the switch (100) are typically similar and may be identical. Further, as viewed externally the two switches (1000) and (100) may be identical in operation. Further, they share many similar components. For this reason, FIGS. 13-16 are essentially designed to replace FIGS. 5B, 7B, 9B, and 11B if one was to view switch (1000) instead of switch (100) with the relevant structures of the remaining FIGS. being essentially the same in both embodiments.

Figure 5A:
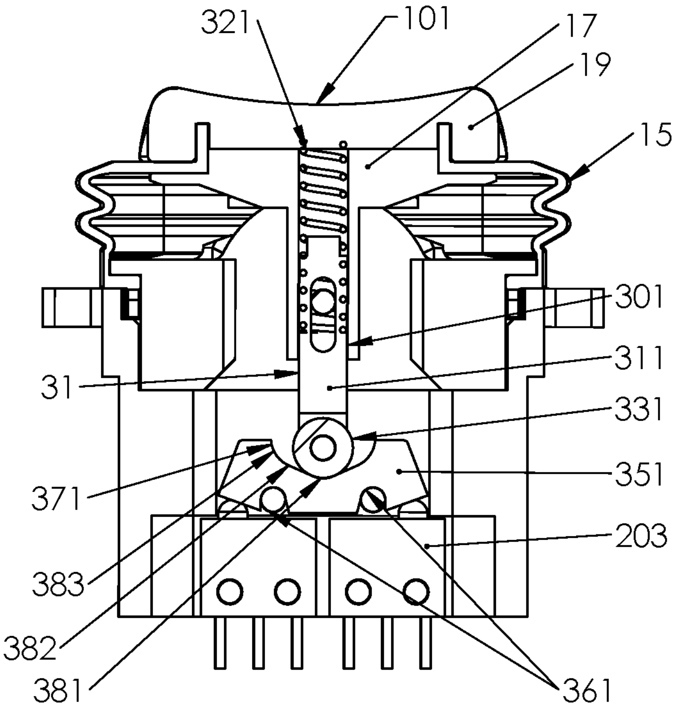
FIG. 5A depicts a cut-through along line A-A in FIG. 4.
Figure 5B:
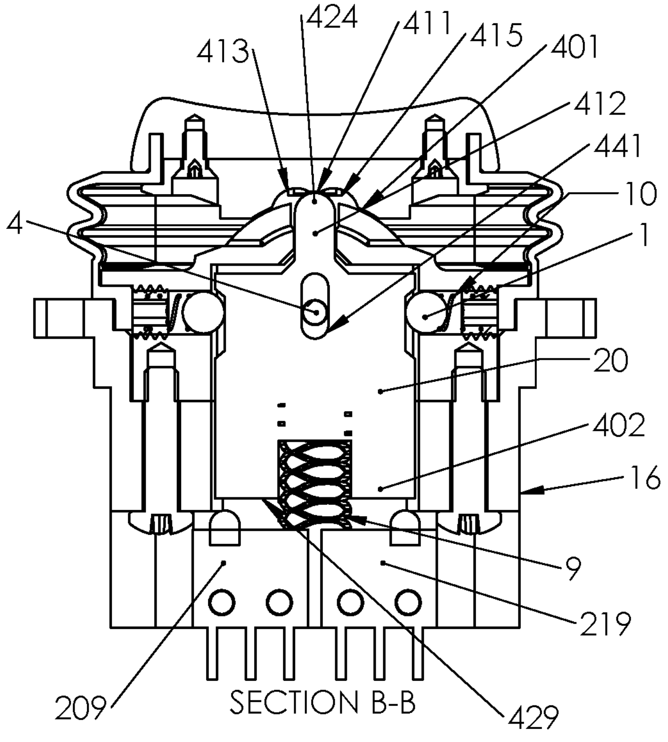
FIG. 5B depicts a cut-through along line B-B in FIG. 4.
Figure 5C:
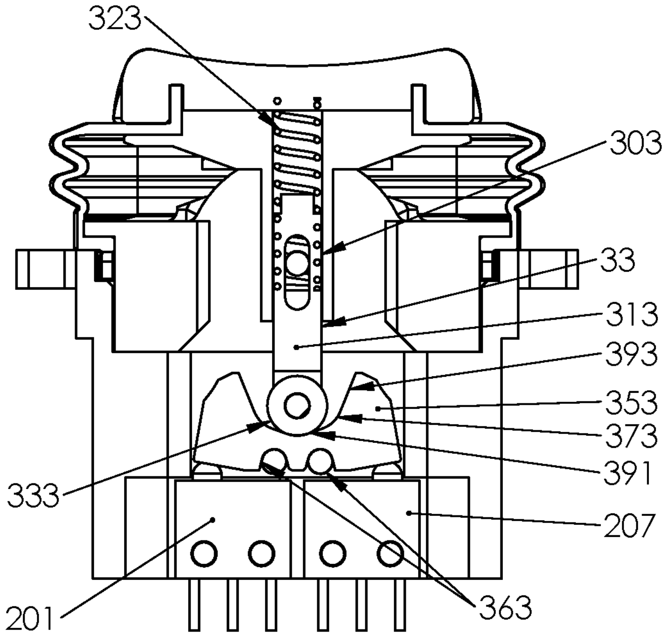
FIG. 5C depicts a cut-through along line C-C in FIG. 4.

As can be seen in FIGS. 5A, 5B, and 5C, the head (101) is attached to a button connector (17). The button connector (17) has three distinct portions which may be co-molded or separate. On either side of center, as viewed, for example, in FIGS. 5A and 5C, the button connector (17) has an extending piston shaft (301) and (303). Each of these then interfaces with a roller shaft (311) or (313) respectively to form a compression piston (31) and (33). Compression coil or wave springs (321) and (323) serve to bias the pistons (31) and (33) to exhibit force pushing downward. At the terminal end of the roller shaft (311) or (313) there is provided a roller (331) and (333).

The central portion of the button connector (17) includes a generally concave lower surface (401) having three generally semi-circular divots (411), (413), and (415) therein. The central divot (411) is typically located in generally the center of the concave lower surface (401) with each of divots (413) and (415) being arranged on the forward and backward side thereof. Under the concave lower surface (401) there is positioned a plunger (20) which, in the embodiment of FIGS. 5A, 5B, and 5C, comprises a lower paddle portion (402) and an upper tab (412) which is typically integrally formed therewith. In the depicted embodiment of FIGS. 5A, 5B, and 5C, the plunger (20) may interact with a spring (10) and ball bearing (1) system to assist in holding the plunger (20) in position while allowing the plunger (20) to move freely up and down within the housing (16), but this is by no means required and may be removed in an alternative embodiment.

In the alternative embodiment of FIGS. 13-16, the plunger (20) includes the upper tab (412). However, the lower paddle portion (1402) has a more complex shape. The lower paddle portion (1402) is generally in the shape of a cross section of a "top hat" and has a lower segment (1412), and an upper segment (1422) where the upper segment is narrower (as viewed in FIGS. 13-16) than the lower segment. The upper segment then uses a step (1432) to interconnect with the upper tab (412). Comparing, for example, FIG. 13 to FIG. 5B, it should be apparent that the lower segment (1412) has similar width to the paddle portion (402). However, including the narrower upper segment (1422) allows for the switch (1000) of FIGS. 13-16 to include a larger channel guide (1501) that the narrower upper segment (1422) can interface with. This provides a lower stop edge (1503) which the upper edge (1403) of the lower segment (1412) will impact when the plunger (20) of FIGS. 13-16 retracts. The channel guide (1501) also includes a cutout segment (1532) which is designed to accept the step (1432). The structure of lower paddle portion (1402) can assist in providing for straighter plunge motion of the plunger (20) in certain embodiments.

In both embodiments, the upper tab (412) typically includes a generally semi-circular top surface (424) which is generally dimensioned to have a radius similar to the radius of the divots (411), (413) and (415). The plunger (20) is positioned above a compression coil or wave spring (9) which serves to bias the plunger (20) toward the button connector (17) and away from circuit switches (209) and (219) which are positioned below the lower edge (429) of the paddle portion (402) or (1402). There is a central stabilizing pin (4) which runs through a raceway (441) in the plunger (20) allowing the plunger (20) to move up and down against the spring (9) in a straight line. The pin (4) extends through the pistons (30) and (31) and is typically attached to the housing (16) to act as an axis of rotation for the button connector (17) relative to the housing (16) via the pistons (30) and (31).

Below each of the rollers (331) and (333) there is positioned a rocker (351) and (353). The rockers (351) and (353) are of distinctly different shape but have some common design features. Each rocker (351) and (353) is supported on two pins (361) or (363) which are typically rigidly attached to the housing (16) as shown for pins (361) in FIG. 3. Rocker (351) is supported on pins (361) and rocker (353) is supported on pins (363). It should be apparent from the FIGS. That pins (361) are positioned at a greater distance from each other than pins (363).

Each rocker (351) and (353) include a concave upper surface forming a track (371) and (373) into which the respective roller (331) and (333) is positioned and can roll. The track (373) will typically have steeper surfaces as well as potentially longer surfaces than track (371) as is visible from comparing FIG. 5A to FIG. 5C. The tracks (371) and (373) are typically generally not semicircular or of consistent radius. The track (373) will often be more parabolic than the track (371). The tracks (371) will also typically include at least two different radii depending on the location within the track (371) or (373).

Track (371) will typically include a first area (381) forming the lowest area. There is then a slightly raised portion or "bump" (382) followed by the higher area (383). This structure is by no means required, but it can improve the feel of movement as discussed later. This structure of track (371) provides multiple areas where the roller (331) can be. The roller (331) can be in the first area (381) where it is stable and pushed toward center by the track (371) and spring (331), it can be rolling up the raised portion (382) where the spring (321) will typically serve to try and push it back toward the first area (381), it can be on the far side of the raised portion (382) where it will be pushed toward the higher area (383), or will be in the higher area (383). Track (373) will typically include a first area (391) which acts as a sort of bowl at the lowest area of the track (373) and the steep sides (393). It may also include a raised area or bump between them in another embodiment.

Operationally the switch (100) will provide for five different "on" positions. These correspond to depressing the pair of circuit switches (201) and (211); (203) and (213); (205) and (215); (207) and (217); or (209) and (219) and a single "off" or home position. FIGS. 5A, 5B, and 5C show the home position where both the rockers (351) and (353) are positioned resting on both of their respective pins (361) and (363). The rollers (331) and (333) are positioned in the low areas (381) and (391) generally centered between the pins (361) or (363) and the plunger (20) is biased above the circuit switches (209) and (219). As can be seen, none of circuit switches (201), (203), (205), (207), (209), (211), (213), (215), (217) and (219) have been depressed, so they are all "off".

Figure 7A:
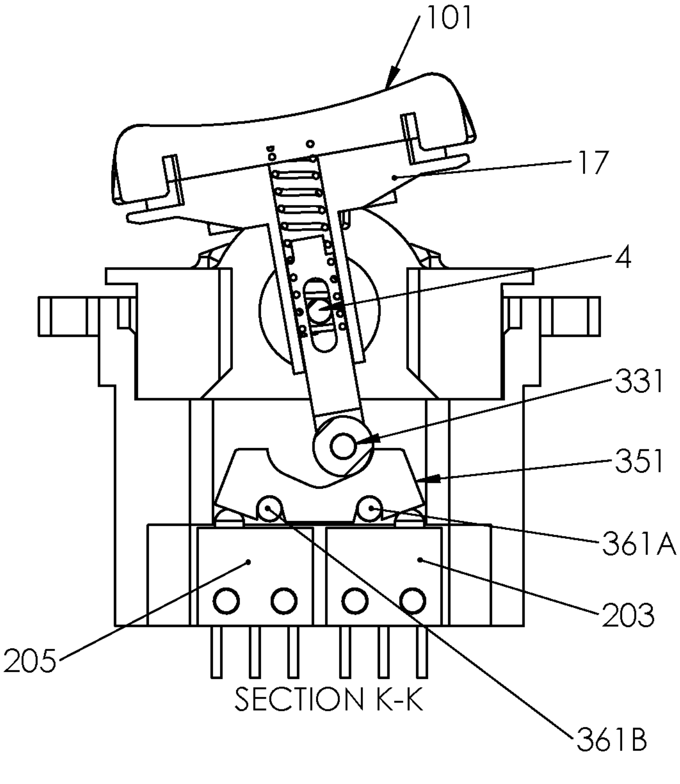
FIG. 7A depicts a cut-through along line K-K in FIG. 6.
Figure 7B:
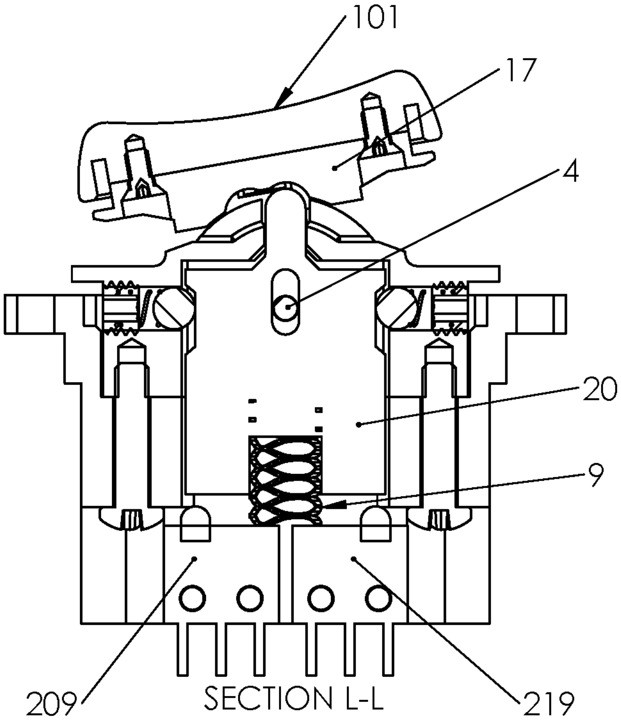
FIG. 7B depicts a cut-through along line L-L in FIG. 6.
Figure 7C:
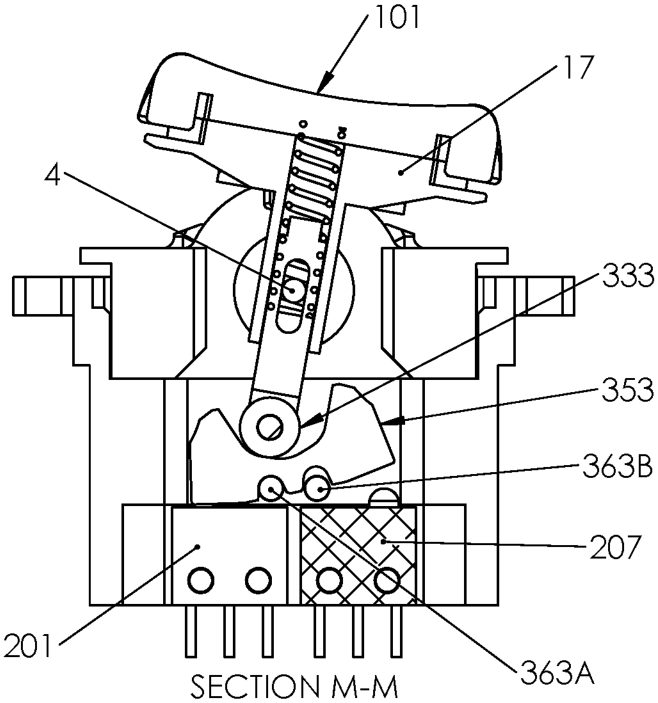
FIG. 7C depicts a cut-through along line M-M in FIG. 6. Note that FIG. 7C is in the opposite direction to FIGS. 7A and 7B which is why the switch appears to have been moved in the opposite direction even though it was not.

FIG. 6 illustrates moving the head (101) to the near forward position where it has been moved slightly forward from the home position of FIG. 4. FIGS. 7A, 7B, and 7C illustrate the movement of the interior components. The head (101) has moved through an angle of about 10 degrees, but this is not required and any rotation amount could be bused in alternative embodiments. The rotation is typically around pin (4). In moving to this position, the roller (331) has rolled up the track (371) and is around the raised area (382). However, the rocker (351) still rests on both pins (361A) and (361B) as the biasing of spring (321) is directed to low on rocker (351) to tip rocker (351). The roller (333) has also rolled up the track (373) and is now on the higher area (393). This has caused the rocker (353) to be tipped by the biasing force of the spring (323) so rocker (353) only rests on the single pin (363A) and has lifted off of pin (363B). This tipping has resulted in the rocker (353) depressing circuit switch (201) (and circuit switch (211) which is next to it but not visible). The tipping, however, has not resulted in the rocker (351) depressing circuit switch (203) (or circuit switch (213) which is next to it but not visible)

It should be apparent, that movement from the home position of FIG. 4 to the near forward position of FIG. 6 does require the user to apply some force to the head (101). In particular, the head (101) requires sufficient force to move the roller (331) up the raised portion (382), start pushing the roller (333) up the steeper area (393) and push the top (424) of the plunger (20) downward. The top (424) of the plunger (20) has also now entered divot (415) which provides a clear feel for the user when this position is reached. However, it is important to note that the plunger (20) has not been deflected enough to contact circuit switches (209) and (219) yet. Typically, the force to activate the switch to this near forward position of FIG. 6 is around 1-2.5 lbs. more preferably around 1-2 lbs. This position also feels stable to the user as a clear specific position, but is not actually stable. Should the user release the head (101), the head (101) would return to the home position of FIG. 4 due to the force of the biasing by springs (321), (323) and (9) as well as the shapes of the rockers (351) and (353).

If the user continues to push the head (101) in the forward direction, it will place the head (101) into the far forward configuration of FIG. 8. At the far forward position, the head (101), in this embodiment, is at a generally 20 degree rotation around pin (4) but this is not required and it could be any amount of rotation greater than that of the near forward position. Moving the head (101) to the far forward position will typically take additional force by the user. Typically, this is about 0.5 to 1.5 lbs. more than near forward position.

Figure 9A:
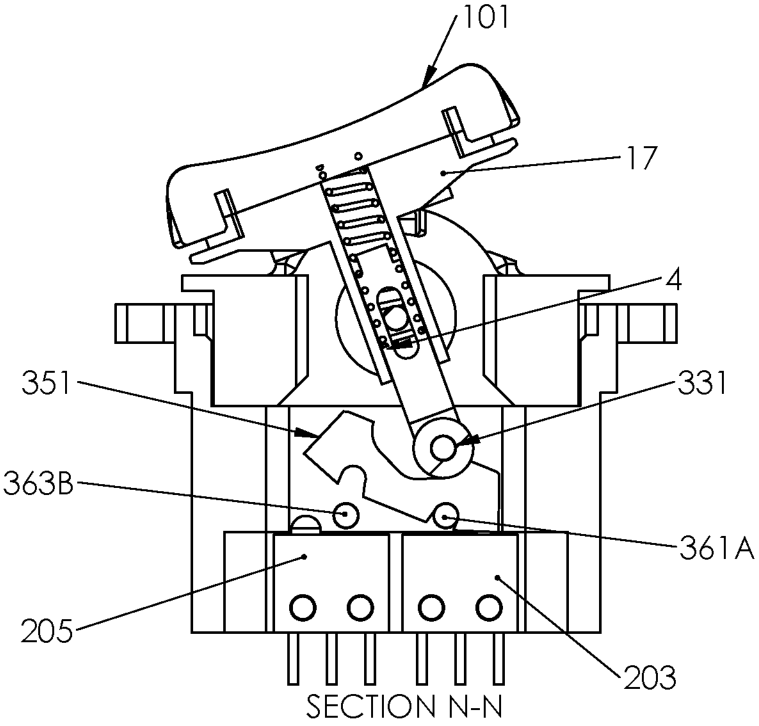
FIG. 9A depicts a cut-through along line N-N in FIG. 8.
Figure 9B:
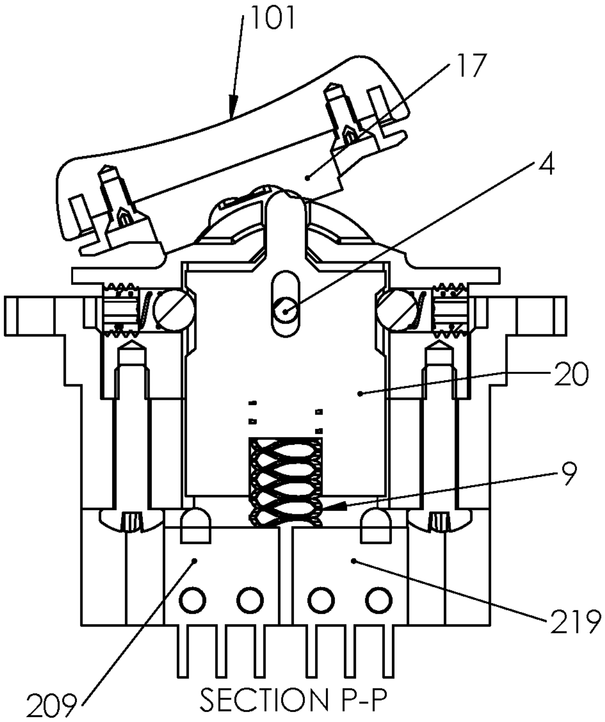
FIG. 9B depicts a cut-through along line P-P in FIG. 8.
Figure 9C:
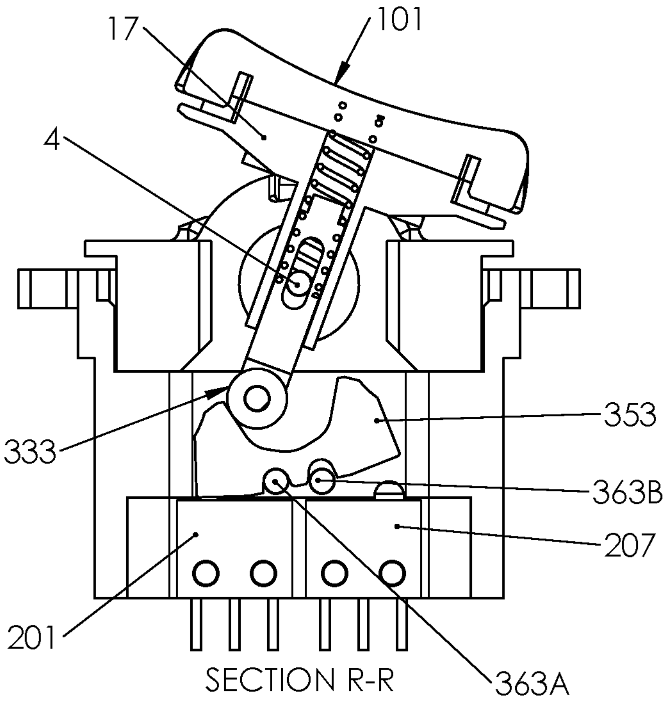
FIG. 9C depicts a cut-through along line R-R in FIG. 8. Note that FIG. 9C is in the opposite direction to FIGS. 9A and 9B which is why the switch appears to have been moved in the opposite direction even though it was not.

In the far forward position, as can be seen in FIGS. 9A, 9B, and 9C, the roller (333) has continued up the steeper area (393) but the rocker (333) has not tilted any further as it is held in place by the circuit switch (201) which inhibits further movement. Instead, the spring (323) has been additionally compressed by the movement. Roller (331), however, has now gotten onto the higher area (383) which has caused the rocker (351) to tip over pin (361A) and leave contact with pin (361B). This has now caused the rocker (351) to depress circuit switch (203) (and circuit switch (213) which is next to it but not visible). Feel for this position may be provided by the contact between the button (17) and the edge of the housing (16) which can be seen toward the left of FIGS. 9A and 9B and the right of FIG. 9C. Note that circuit switches (201) and (211) are still depressed in the far forward position. However, the new depression of circuit switches (203) and (213) makes this a new "on" position.

From the far forward position of FIG. 8, the head (101) will still return to center (the home position of FIG. 4) if the user lets up on the pushing force at any point due to the biasing of springs (321), (323) and (9). Due to the presence of the coil springs (321), (323), and (9) along with the divots (411), (413), and (415) and the variations in the tracks (371) and (373) the activation of the present switch feels like a snap action mechanism for movement to any of the near forward or far forward positions from any other position.

While FIGS. 6 and 8 illustrate the near and far forward positions, it should be apparent that the switch head (101) can be moved the opposing (backward) direction (toward the right of the page in FIGS. 4, 6, and 8) which will produce two similar near backward and far backward positions which are essentially mirror images of the positions in FIGS. 7A, 7B, 7C, 9A, 9B, and 9C. Basically, the motion is the same except that the rockers (351) and (353) tip over pins (361B) and (363B) leaving their connection with pins (361A) and (363A) and switch pairs (205) (215) and (207) (217) are activated. This produces four different "on" positions for the switch (100). To put this another way, if the near forward position comprises tilting the head 10 degrees and the far forward position comprises tilting the head 20 degrees, the near backward position would typically comprise tilting the head (101) −10 degrees and the far backward position comprises tilting the head (101) −20 degrees.

Regardless of position (near forward, far forward, near backward, or far backward), it should be apparent that the circuit switches associated with each position activate simultaneously. Thus, with double redundancy, the circuit switches in each pair (201) and (211); (203) and (213); (205) and (215); (207) and (217); or (209) and (219) are being depressed by the respective rocker at essentially the same time. Further, in order to increase redundancy, additional circuit switches may be placed beside either of the existing circuit switches in any or all of pair (201) and (211); (203) and (213); (205) and (215); (207) and (217); or (209) and (219) to produce additional redundancy at any position.

Figure 11A:
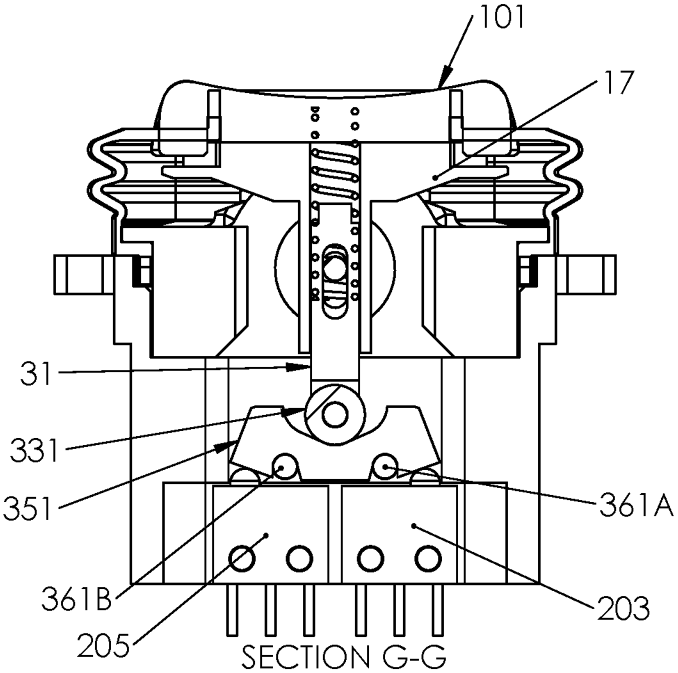
FIG. 11A depicts a cut-through along line G-G in FIG. 10.
Figure 11B:
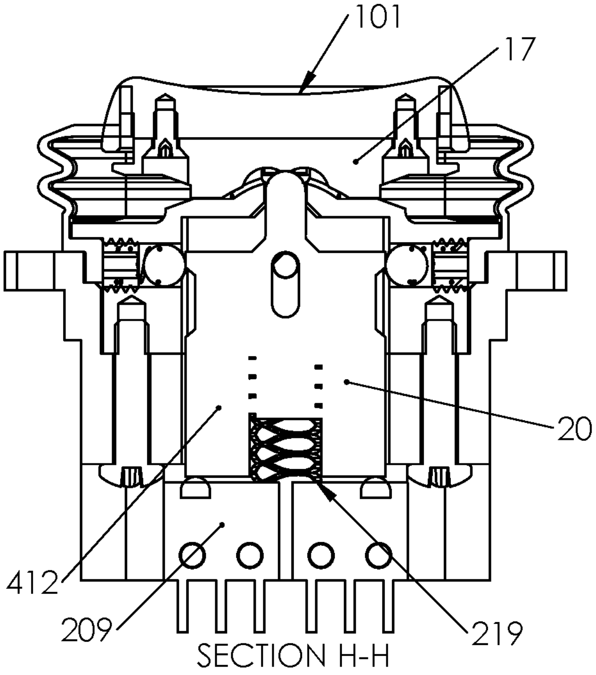
FIG. 11B depicts a cut-through along line H-H in FIG. 10.
Figure 11C:
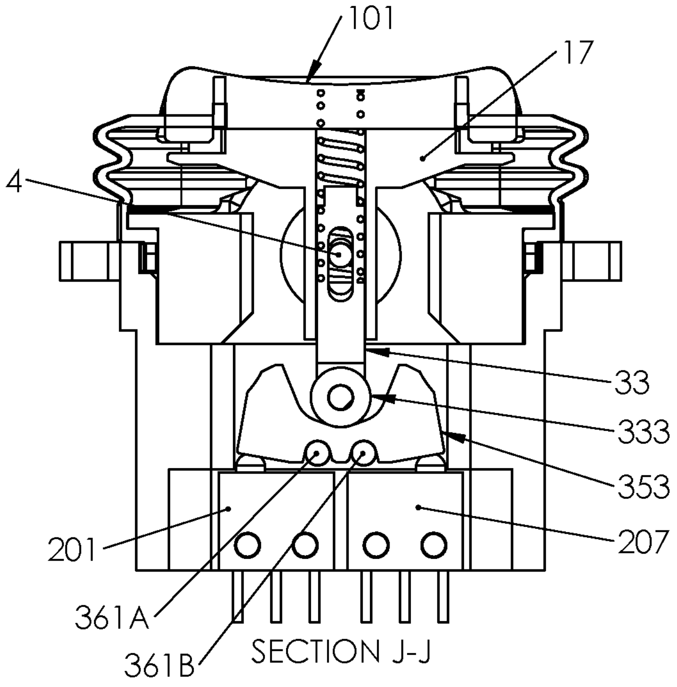
FIG. 11C depicts a cut-through along line J-J in FIG. 10.
Figure 12:
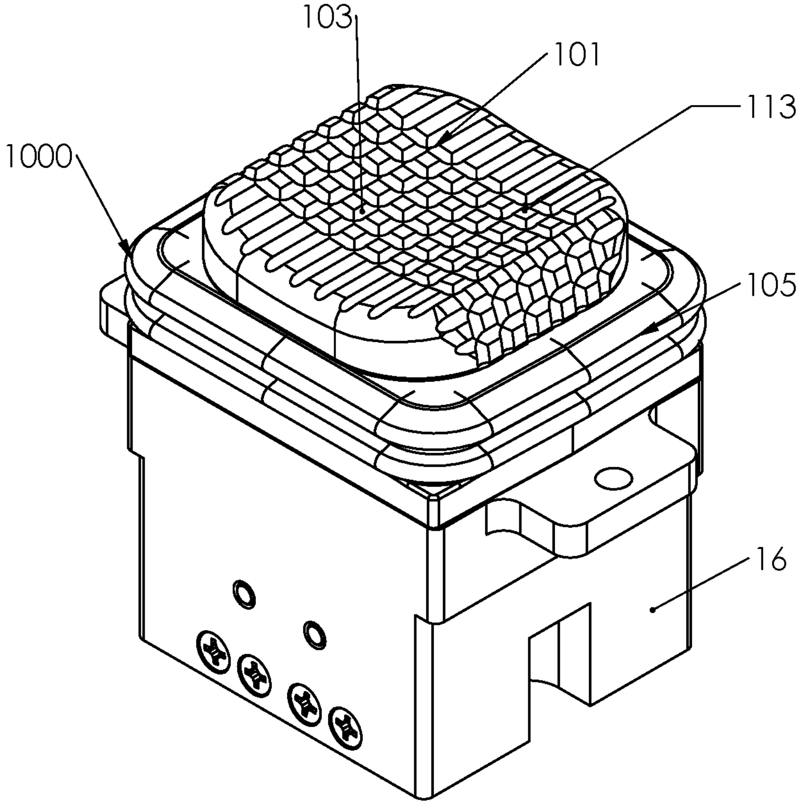
FIG. 12 depicts a left top perspective view of a second embodiment of a multiple position switch.
Figure 13:
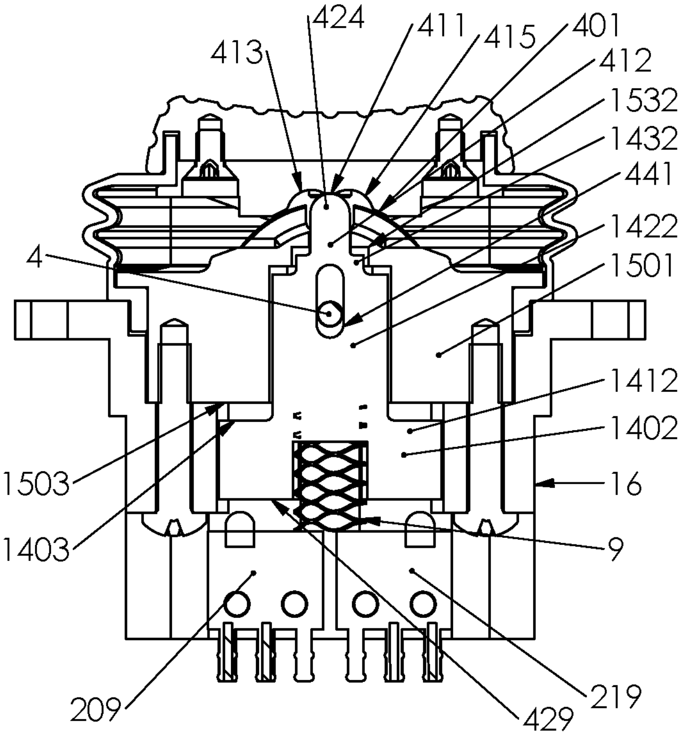
FIG. 13 depicts a cut-through image equivalent to that of FIG. 5B but on the embodiment of FIG. 12.
Figure 14:
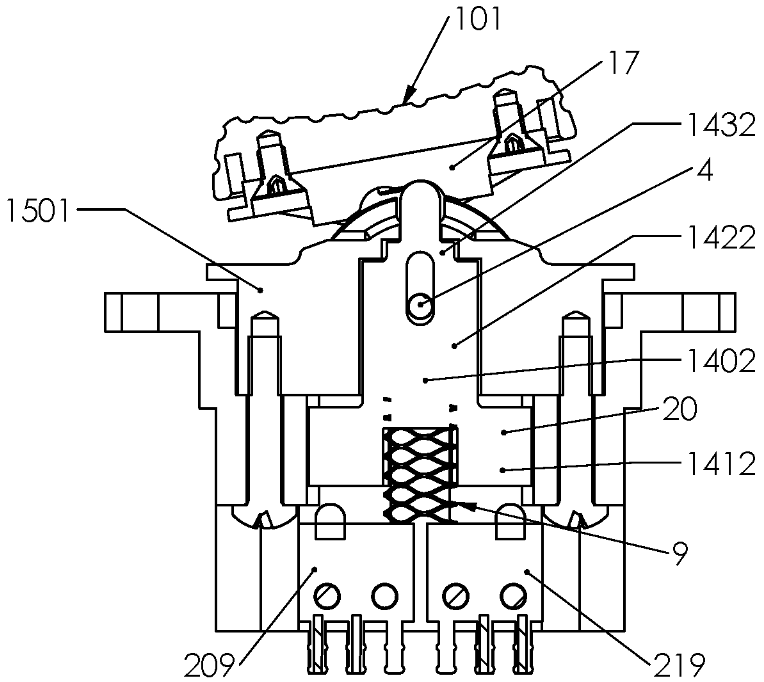
FIG. 14 depicts a cut-through equivalent to that of FIG. 7B but on the embodiment of FIG. 12.
Figure 15:
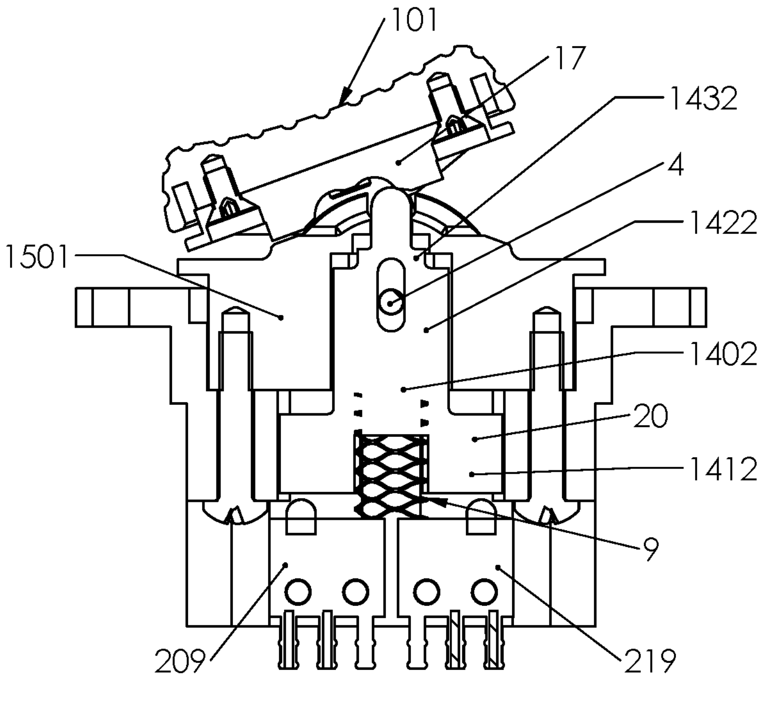
FIG. 15 depicts a cut-through equivalent to that of FIG. 9B but on the embodiment of FIG. 12.
Figure 16:
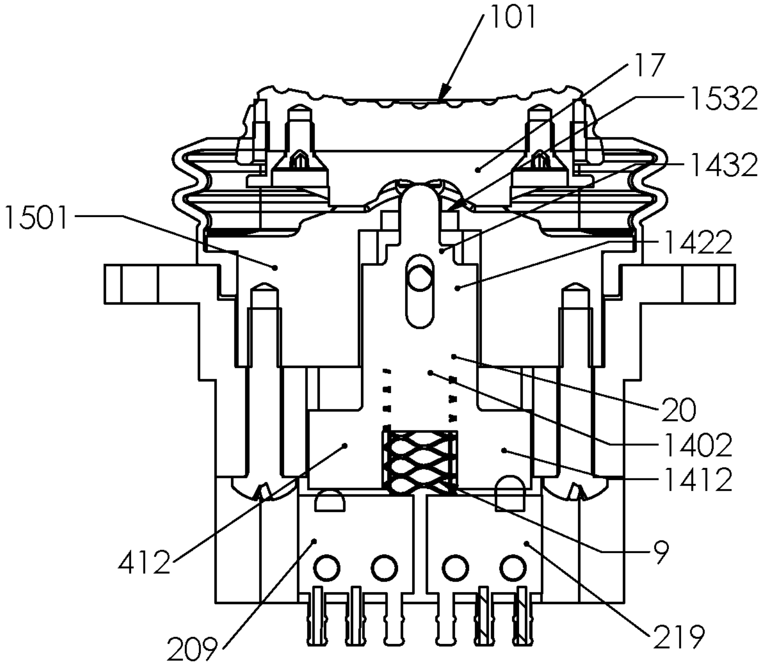
FIG. 16 depicts a cut-through equivalent to that of FIG. 11B but on the embodiment of FIG. 12.

The fifth position of the switch (100) is produced with the head (101) centered as shown in FIG. 10, but the head (100) is depressed a short distance directly into the housing (16). This plunge position is shown in FIGS. 11A, 11B, and 11C. As can be best seen in FIG. 11B, pushing the head (101) straight down from the center position results in the concave base (401) pushing the top (424) (which is in divot (411)) downward and against the biasing of spring (9). This causes the entire plunger (20) to depress and the bottom (429) of the paddle (402) to depress the circuit switch (209) and (219) generally simultaneously.

As can also be seen from FIGS. 11A, and 11C, depression of the button (17) when centered simply causes the two pistons (30) and (31) to compress against springs (321) and (323). However, because the rollers (331) and (333) are currently centered on the tracks (371) and (373) of the rockers (351) and (353), the rockers (351) and (353) are not encouraged to tip in any direction. Instead, the increased force simply pushes each of the rockers (351) and (353) into their respective pin pair (361) or (363). Thus, in the plunge position of FIG. 10, only the center pair of circuit switches (209) and (219) are activated. This plunge position provides the fifth "on" position. It should be apparent, that if the user lets up force from this depression, the springs (321), (323), and (9) will bias the button (17) and the head (101) back to the home position of FIG. 4.

In the embodiment of the present FIGS, the plunge position which the paddle (402) of the plunger (20) depressing the circuit switches (209) and (219) is only available when the head (101) is centered as in FIG. 11. This is because the head (101) and/or button (17) may be blocked from downward movement when the head (101) has been rotated to the relevant angles for the near or far forward or backward positions. This block may be through simple shaping of the button (17) and housing (16) or there may be included barriers within or on the housing (16) and/or button (17) to inhibit such motion. However, in an alternative embodiment, the plunge activation (namely the paddle (402) bottom (429) depressing circuit switches (209) and (219)) may occur at any or all of the near forward, far forward, near backward, or far backward positions by simply pushing the head (101) downward toward the housing (16) while holding the head (101) in the tilted angle corresponding to that position.

While the invention has been disclosed in conjunction with a description of certain embodiments, the detailed description is intended to be illustrative and should not be understood to limit the scope of the present disclosure. As would be understood by one of ordinary skill in the art, embodiments other than those described in detail herein are encompassed by the disclosed invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is truly "circular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A multi-position switch comprising:

a switch head;

a button support attached to said switch head and configured to rotate to a first detent position and a second detent position located on a first side of a center position and a third detent position and a fourth detent position located on a second side opposing said first side of said center position;

a first piston shaft connected to said button support and connected to a first roller positioned in a first track formed from a concave upper surface of a first rocker, said first track having a first area and a second area;

a second piston shaft connected to said button support and connected to a second roller positioned in a second track formed from a concave upper surface of a second rocker, said second track having a third area and a fourth area;

a first circuit switch arranged so as to be switched when said first roller is in contact with said second area tipping said first rocker toward said first side as said button support rotates to said first detent position;

a second circuit switch arranged so as to be switched when said second roller is in contact with said fourth area tipping said second rocker toward said first side as said button support rotates to said second detent position;

a third circuit switch arranged so as to be switched when said first roller is in contact with said second area tipping said first rocker toward said second side as said button support rotates to said third detent position;

a fourth circuit switch arranged so as to be switched when said second roller is in contact with said fourth area tipping said second rocker toward said second side as said button support rotates to said fourth detent position;

a plunger where depression of said button support in said center position causes said plunger to switch a fifth circuit switch.

2. The multi-position switch of claim 1 wherein said first circuit switch is one of a plurality of switches switched when said first rocker is tipped by said first roller as said button support rotates to said first detent position.

3. The multi-position switch of claim 2 wherein said second circuit switch is one of a plurality of switches switched when said second rocker is tipped by said second roller as said button support rotates to said second detent position.

4. The multi-position switch of claim 3 wherein said third circuit switch is one of a plurality of switches switched when said first rocker is tipped by said first roller as said button support rotates to said third detent position.

5. The multi-position switch of claim 4 wherein said fourth circuit switch is one of a plurality of switches switched when said second rocker is tipped by said second roller as said button support rotates to said fourth detent position.

6. The multi-position switch of claim 5 wherein said fifth circuit switch is one of a plurality of switches switched by said plunger when said button support in said center position is depressed.

7. The multi-position switch of claim 1 wherein said first area and said second area have different radii relative a common axis.

8. The multi-position switch of claim 7 wherein said third area and said fourth area have different radii relative a common axis.

9. The multi-position switch of claim 8 wherein said first area, said second area, said third area, and said fourth area all have different radii relative a common axis.

10. The multi-position switch of claim 1 wherein said first rocker tips suddenly as said first roller transitions from said first area to said second area.

11. The multi-position switch of claim 10 wherein said second rocker tips suddenly as said second roller transitions from said third area to said fourth area.

12. The multi-position switch of claim 1 wherein said second rocker tips suddenly as said second roller transitions from said third area to said fourth area.

13. The multi-position switch of claim 1 wherein said first rocker tips about a first pin in a first pair of pins when said first rocker tips toward said first side.

14. The multi-position switch of claim 13 wherein said second rocker tips about a first pin of a second pair of pins when said second rocker tips toward said first side.

15. The multi-position switch of claim 14 wherein said first rocker tips about a second pin of said first pair of pins when said first rocker tips toward said second side.

16. The multi-position switch of claim 15 wherein said second rocker tips about a second pin of said second pair of pins when said second rocker tips toward said second side.

17. The multi-position switch of claim 1 wherein said first roller is connected to said first piston shaft via a spring.

18. The multi-position switch of claim 17 wherein said second roller is connected to said second piston shaft via a spring.

19. The multi-position switch of claim 1 wherein said first circuit switch remains switched when said second circuit switch is switched.

20. The multi-position switch of claim 19 wherein said third circuit switch remains switched when said fourth circuit switch is switched.

* * * * *